United States Patent
Smith

(10) Patent No.: US 10,444,836 B2
(45) Date of Patent: Oct. 15, 2019

(54) ACCESSIBILITY AIDS FOR USERS OF ELECTRONIC DEVICES

(71) Applicant: barnesandnoble.com llc, New York, NY (US)

(72) Inventor: Ian C. Smith, Palo Alto, CA (US)

(73) Assignee: Nook Digital, LLC, New York, NY (US)

( * ) Notice: Subject to any disclaimer, the term of this patent is extended or adjusted under 35 U.S.C. 154(b) by 117 days.

(21) Appl. No.: 13/912,980

(22) Filed: Jun. 7, 2013

(65) Prior Publication Data

US 2013/0332827 A1    Dec. 12, 2013

Related U.S. Application Data

(60) Provisional application No. 61/689,510, filed on Jun. 7, 2012, provisional application No. 61/689,511, filed on Jun. 7, 2012.

(51) Int. Cl.
*G06F 3/041* (2006.01)
*G09G 3/36* (2006.01)
(Continued)

(52) U.S. Cl.
CPC ............ *G06F 3/016* (2013.01); *G06F 3/0487* (2013.01); *G09B 21/003* (2013.01); *G09B 21/007* (2013.01); *G06F 2203/04809* (2013.01)

(58) Field of Classification Search
CPC .................. G06F 3/016; G06F 3/0487; G06F 2203/04809; G09B 21/003; G09B 21/007
(Continued)

(56) References Cited

U.S. PATENT DOCUMENTS

| 4,896,543 A | 1/1990 | Gullman |
| 5,485,197 A | 1/1996 | Hoarty |

(Continued)

FOREIGN PATENT DOCUMENTS

| EP | 722150 A1 | 7/1996 |
| WO | 2012170745 A2 | 12/2012 |
| WO | WO 2012170745 A2 * | 12/2012 |

OTHER PUBLICATIONS

Smith, U.S. Appl. No. 13/912,976, filed Jun. 7, 2013, entitled, "Accessibility Aids for Users of Electronic Devices."
(Continued)

*Primary Examiner* — Nelson M Rosario
(74) *Attorney, Agent, or Firm* — Finch & Maloney PLLC

(57) ABSTRACT

A simplified UI mode is provided for computing devices, where complex user interface elements are replaced with simpler ones. In one embodiment, content, functions, and/or other selectable items on the home screen or panel(s) of the device are assembled into a one-dimensional list. In some cases, the simplified UI mode can be configured to receive a parsing gesture (e.g., downward drag gesture or a three-finger tap) that causes an item of the list to be aurally presented to the user, and a selection gesture (e.g., release of the drag gesture or a two-finger tap) to select the last aurally presented item. The simplified UI mode may be used in conjunction with a screen protector configured with tactile aid(s) configured to facilitate use of the device by a vision-impaired user. In one case, one of the tactile aids of the screen protector indicates how to activate the simplified user interface mode.

20 Claims, 7 Drawing Sheets

(51) Int. Cl.
*G06F 3/01* (2006.01)
*G09B 21/00* (2006.01)
*G06F 3/0487* (2013.01)

(58) Field of Classification Search
USPC ........ 345/173–178; 340/407.2; 434/113–117
See application file for complete search history.

(56) References Cited

U.S. PATENT DOCUMENTS

| | | |
|---|---|---|
| 5,633,471 A | 5/1997 | Fukushima |
| 5,844,557 A | 12/1998 | Shively, II |
| 6,115,482 A | 9/2000 | Sears et al. |
| 6,259,438 B1 | 6/2001 | Fleck et al. |
| 6,334,157 B1 | 12/2001 | Oppermann et al. |
| 6,933,928 B1 | 8/2005 | Lilienthal |
| 6,956,564 B1 | 10/2005 | Williams |
| 7,107,533 B2 | 9/2006 | Duncan et al. |
| 7,649,524 B2 | 1/2010 | Haim et al. |
| 7,840,912 B2 | 11/2010 | Elias et al. |
| 7,898,541 B2 | 3/2011 | Hong et al. |
| 7,966,577 B2 | 6/2011 | Chaudhri et al. |
| RE42,738 E | 9/2011 | Williams |
| 8,059,101 B2 | 11/2011 | Westerman et al. |
| 8,239,413 B2 | 8/2012 | Hubert |
| 8,274,536 B2 | 9/2012 | Chaudhri et al. |
| 8,286,104 B1 | 10/2012 | Yonge-Mallo |
| D670,713 S | 11/2012 | Cranfill et al. |
| RE44,103 E | 3/2013 | Williams |
| 8,400,417 B2 | 3/2013 | Ording et al. |
| 8,452,600 B2 | 5/2013 | Fleizach |
| 8,508,494 B2 | 8/2013 | Moore |
| 8,659,555 B2 | 2/2014 | Pihlaja |
| 8,766,928 B2 | 7/2014 | Weeldreyer et al. |
| 9,261,961 B2 | 2/2016 | Smith |
| 9,615,231 B2 * | 4/2017 | Thiele .................. H04W 4/027 |
| 9,658,746 B2 | 5/2017 | Cohn et al. |
| 9,971,495 B2 | 5/2018 | Shetty et al. |
| 2001/0025289 A1 | 9/2001 | Jenkins et al. |
| 2001/0028369 A1 | 10/2001 | Gallo et al. |
| 2002/0069071 A1 | 6/2002 | Knockeart et al. |
| 2002/0116421 A1 | 8/2002 | Fox et al. |
| 2005/0164688 A1 * | 7/2005 | Satake ................ H04M 1/6041 |
| | | 455/418 |
| 2005/0216839 A1 | 9/2005 | Salvucci |
| 2005/0229102 A1 | 10/2005 | Watson et al. |
| 2006/0053372 A1 | 3/2006 | Adkins |
| 2006/0067577 A1 | 3/2006 | Marggraff |
| 2007/0047002 A1 | 3/2007 | Hull et al. |
| 2008/0020356 A1 * | 1/2008 | Saba ........................... 434/113 |
| 2008/0036747 A1 | 2/2008 | Hope |
| 2009/0064031 A1 | 3/2009 | Bull et al. |
| 2009/0094548 A1 | 4/2009 | Nobori et al. |
| 2009/0228798 A1 | 9/2009 | Kephart et al. |
| 2009/0252311 A1 | 10/2009 | Kuiken |
| 2009/0295734 A1 | 12/2009 | Hendrickson et al. |
| 2010/0083179 A1 | 4/2010 | Decker et al. |
| 2010/0100854 A1 | 4/2010 | Russell et al. |
| 2010/0192086 A1 | 7/2010 | Kocienda et al. |
| 2010/0229130 A1 | 9/2010 | Edge et al. |
| 2010/0259482 A1 | 10/2010 | Ball |
| 2010/0262659 A1 | 10/2010 | Christiansen et al. |
| 2010/0283744 A1 * | 11/2010 | Nordenhake ....... G06F 3/04883 |
| | | 345/173 |
| 2010/0299638 A1 | 11/2010 | Choi |
| 2010/0318895 A1 | 12/2010 | Steinberger et al. |
| 2010/0324902 A1 | 12/2010 | Kurzwell et al. |
| 2010/0328052 A1 * | 12/2010 | Pasquero et al. .......... 340/407.2 |
| 2011/0010659 A1 | 1/2011 | Kim et al. |
| 2011/0050591 A1 | 3/2011 | Kim et al. |
| 2011/0167350 A1 | 7/2011 | Hoellwarth |
| 2011/0191675 A1 | 8/2011 | Kauranen |
| 2011/0210926 A1 | 9/2011 | Pasquero et al. |
| 2011/0234543 A1 | 9/2011 | Gardenfors et al. |
| 2011/0258542 A1 | 10/2011 | Kenney et al. |
| 2011/0273379 A1 | 11/2011 | Chen et al. |
| 2011/0283241 A1 | 11/2011 | Miller et al. |
| 2011/0304558 A1 * | 12/2011 | Pasquero et al. ............. 345/173 |
| 2011/0307833 A1 | 12/2011 | Dale et al. |
| 2011/0310026 A1 | 12/2011 | Davis et al. |
| 2012/0001843 A1 * | 1/2012 | Gravino ................ G06F 1/1694 |
| | | 345/156 |
| 2012/0046947 A1 | 2/2012 | Fleizach |
| 2012/0050159 A1 | 3/2012 | Yu et al. |
| 2012/0056821 A1 | 3/2012 | Goh |
| 2012/0084694 A1 | 4/2012 | Sirpal et al. |
| 2012/0084704 A1 | 4/2012 | Lee et al. |
| 2012/0110517 A1 | 5/2012 | Sparks et al. |
| 2012/0124505 A1 | 5/2012 | St. Jacques, Jr. |
| 2012/0127110 A1 | 5/2012 | Amm et al. |
| 2012/0139879 A1 | 6/2012 | Kim et al. |
| 2012/0192093 A1 | 7/2012 | Migos |
| 2012/0192118 A1 | 7/2012 | Migos |
| 2012/0221938 A1 | 8/2012 | Patterson et al. |
| 2012/0235901 A1 | 9/2012 | Binder |
| 2012/0235938 A1 | 9/2012 | Laubach |
| 2012/0240041 A1 | 9/2012 | Lim et al. |
| 2012/0242579 A1 | 9/2012 | Chua |
| 2012/0242584 A1 | 9/2012 | Tuli |
| 2012/0249768 A1 | 10/2012 | Binder |
| 2012/0272144 A1 | 10/2012 | Radakovitz et al. |
| 2012/0280947 A1 | 11/2012 | Weaver et al. |
| 2012/0299853 A1 | 11/2012 | Dagar |
| 2012/0306765 A1 | 12/2012 | Moore |
| 2012/0306772 A1 | 12/2012 | Tan |
| 2012/0311438 A1 | 12/2012 | Cranfill et al. |
| 2012/0313848 A1 | 12/2012 | Galor et al. |
| 2012/0324355 A1 | 12/2012 | Mbenkum et al. |
| 2012/0329529 A1 | 12/2012 | van der Raadt |
| 2013/0016045 A1 | 1/2013 | Zhao et al. |
| 2013/0019263 A1 | 1/2013 | Ferren et al. |
| 2013/0024820 A1 | 1/2013 | Kirkpatrick |
| 2013/0036383 A1 | 2/2013 | Yuan et al. |
| 2013/0047115 A1 | 2/2013 | Migos et al. |
| 2013/0055141 A1 | 2/2013 | Arriola et al. |
| 2013/0063364 A1 | 3/2013 | Moore |
| 2013/0073998 A1 | 3/2013 | Migos et al. |
| 2013/0076632 A1 | 3/2013 | Sirpal et al. |
| 2013/0076637 A1 | 3/2013 | Teltz |
| 2013/0076638 A1 | 3/2013 | Sirpal et al. |
| 2013/0076781 A1 | 3/2013 | Sirpal et al. |
| 2013/0111407 A1 | 5/2013 | Mullen |
| 2013/0113699 A1 | 5/2013 | Lim |
| 2013/0117702 A1 | 5/2013 | Jang et al. |
| 2013/0120271 A1 | 5/2013 | Lee et al. |
| 2013/0130216 A1 | 5/2013 | Morton et al. |
| 2013/0135234 A1 | 5/2013 | Hisano et al. |
| 2013/0139078 A1 | 5/2013 | Chuang et al. |
| 2013/0139107 A1 | 5/2013 | Jung |
| 2013/0151955 A1 | 6/2013 | Williams |
| 2013/0155094 A1 | 6/2013 | Ahn |
| 2013/0159939 A1 | 6/2013 | Krishnamurthi |
| 2013/0162532 A1 | 6/2013 | Cheng et al. |
| 2013/0185680 A1 | 7/2013 | Chaudhri et al. |
| 2013/0194308 A1 | 8/2013 | Privault et al. |
| 2013/0212454 A1 | 8/2013 | Casey |
| 2013/0222274 A1 | 8/2013 | Mori et al. |
| 2013/0232408 A1 | 9/2013 | Xu |
| 2013/0268826 A1 | 10/2013 | Nowakowski et al. |
| 2013/0304474 A1 | 11/2013 | Conkie et al. |
| 2013/0328809 A1 | 12/2013 | Smith |
| 2014/0026055 A1 | 1/2014 | Cohn et al. |
| 2014/0123032 A1 | 5/2014 | Lanz et al. |
| 2014/0127667 A1 | 5/2014 | Iannacone |
| 2014/0142954 A1 | 5/2014 | Cameron et al. |
| 2014/0160035 A1 | 6/2014 | Sauer et al. |
| 2014/0189056 A1 | 7/2014 | St. Clair et al. |
| 2014/0189524 A1 | 7/2014 | Murarka et al. |
| 2014/0189531 A1 | 7/2014 | Murarka et al. |
| 2014/0189539 A1 | 7/2014 | St. Clair et al. |
| 2014/0210729 A1 | 7/2014 | Chattopadhyay et al. |
| 2014/0215329 A1 * | 7/2014 | Zilberman et al. ............. 715/702 |
| 2014/0215339 A1 | 7/2014 | Klein et al. |

(56) References Cited

U.S. PATENT DOCUMENTS

| | | |
|---|---|---|
| 2014/0215340 A1 | 7/2014 | Shetty et al. |
| 2014/0223381 A1 | 8/2014 | Huang et al. |
| 2014/0354594 A1* | 12/2014 | Kreutzer et al. ............ 345/174 |

OTHER PUBLICATIONS

Non-Final Office Action received for U.S. Appl. No. 13/912,976, dated Jan. 5, 2015. 15 pages.
Final Office Action received for U.S. Appl. No. 13/912,976, dated Jun. 5, 2015. 20 pages.
Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.
"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.
"Bamboo Stylus," Wacom Americas, http://www.wacom.com/en/products/stylus, 5 pages, printed from the Internet on Jun. 20, 2013.
Robertson, ADI, "Blue Tiger pressure-sensitive iOS stylus will work over Bluetooth 4.0," Http://www.theverge.com/2012/3/7/2851562/blue-tiger-ten-one-design-pressure-sensitive-bluetooth-4-0-stylus, 1 page, printed from the Internet on Aug. 2, 2013.
Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.
"Pen," DuoSense Pen, N-trig Hands-on computing, http://www.n-trig.com/Content.aspx?Page=DigitalPencil, 3 pages, printed from the Internet on Jun. 20, 2013.
"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.
"EMR (Electro-Magnetic Resonance) Technology—The De Facto Standard for Pen Tablet Devices is Realized using EMR Technology," Wacom Components: Input Technology: EMR Technology, http://wacom-components.com/english/technology/emr.html, 5 pages, printed from the Internet on Aug. 2, 2013.
"Simultaneous Pen & Touch: The Natural Way to Work," Perceptive Pixel Active Stylus, www.perceptivepixel.com/_literature_ 136086/Active_Stylus, 2 pages, printed from the Internet on Dec. 14, 2012.
"Future Apple Notebooks & Tablets may use Acoustic Commands—Patently Apple," originally published Feb. 18, 2011, Http://www.patentlyapple.com/patently-apple/2011/02/future-apple-notebooks-tablets-may,6 pages, printed from the Internet on Nov. 3, 2012.
"Guidelines for selecting text and images (Windows Store apps)," http://msdn.microsoft.com/en-us/library/windows/apps/hh465334, 5 pages, printed from the Internet on Jun. 20, 2013.
Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.
"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.
"How do WACOM tablets work?," tablel4u.co.uk, http://www.lablet4u.co.uk/techinfo.html, 2 pages, printed from the Internet on Jun. 20, 2013.
Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.
"Desktop Touchscreens,"—Desktop touchscreens explained, http://www.touchscreenmagazine.nl/touchscreen-solutions/desktop-touchscreens, 1 page, printed from the Internet on Nov. 3, 2012.
"MTStylus Wireless Stereo Stylus for iPhone/Andriod Phone & Tablet," dexim-MTStylus Wireless Stereo Stylus, Http://www.dexim.nel/contenl.php?id=165&pid=11, 2 pages, printed from the Internet on Jun. 20, 2013.
"Padblue 2," BRANDO—mobile.brando.com, http://mobile.brando.com/Padblue-2_p9162c1577d94.html., 4 pages, printed from the Internet on May 10, 2013.
"Fingas, Jon, ""Panasonic mobile devices to use Anoto's pattern-based pen input technology,"" posted Jan. 8, 2013 at 1 :OOPM, http://www.engadgel.com/2013/01 /08/panasonic-mobile-devices-to-use-anoto-pattern-pen-, 4 pages, printed from the Internet on Jun. 20, 2013."
"Bluetooth 4.0 SmartPen The future just got a little brighter," Pogo Connect, http://tenonedesign.com/connecl.php, 7 pages, printed from the Internet on Jun. 20, 2013.
"Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013."
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, Http://www.wired.com/gadgetlab/2012/05/why-ftipping-through-paper-like-pages-endures-in-the-digital-world/, 5 pages, printed from the Internet on May 6, 2013.
"Explaining how the sPen tech works (and is very dill than other styluses)," http://forum.xda-developers.com/showthread.php?t=, 1 page, printed from the Internet on Jan. 15, 2013.
Kanai, et al., "Intra-Rendition Navigation," Copyright 2012-2013 International Digital Publishing Forum (IDPF), 13 pages.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Andrew Bragdon et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", printed from www.google.com/mobile/gesture-search on Dec. 26, 2012.
Decision on Appeal, U.S. Appl. No. 13/751,940, Patent Trial and Appeal Board Appeal 2017-000948 (dated May 2, 2017).
"Adonit Jot Touch (for iPad)," Adonit Jot Touch (for iPad) Review & Rating—PCMag.com; http://www.pcmag.com/article2/

(56) References Cited

OTHER PUBLICATIONS 0,2817,2411192,00.asp; 6pages, printed from the Internet on Jun. 20, 2013.

* cited by examiner

ACCESSIBILITY AIDS FOR USERS OF ELECTRONIC DEVICES

RELATED APPLICATION

This application claims the benefit of U.S. Provisional Application Nos. 61/689,510 and 61/689,511, both filed on Jun. 7, 2012. In addition, this application is related to U.S. application Ser. No. 13/912,976 filed Jun. 7, 2013 and titled "Accessibility Aids for Users of Electronic Devices." Each of these applications is herein incorporated by reference in its entirety.

FIELD OF THE DISCLOSURE

This disclosure relates to electronic computing devices, and more particularly, to accessibility aids for users of electronic computing devices.

BACKGROUND

Electronic computing devices such as tablets, e-readers, mobile phones, smart phones and personal digital assistants (PDAs) are commonly used to provide a user with both consumable and non-consumable content. Examples of consumable content include e-books, webpages, images, videos and maps; examples of non-consumable content include menus, settings, icons, control buttons and scroll bars. Such electronic devices typically include a user interface that allows a user to interact with the device, its applications and its content. For example, the user interface may include a touch screen display and/or one or more displayed labels that correspond to hardware controls associated with the device. A touchscreen display may or may not be backlit, and may be implemented for instance with a light-emitting diode (LED) screen or an electrophoretic display.

DETAILED DESCRIPTION

Figure 1A:
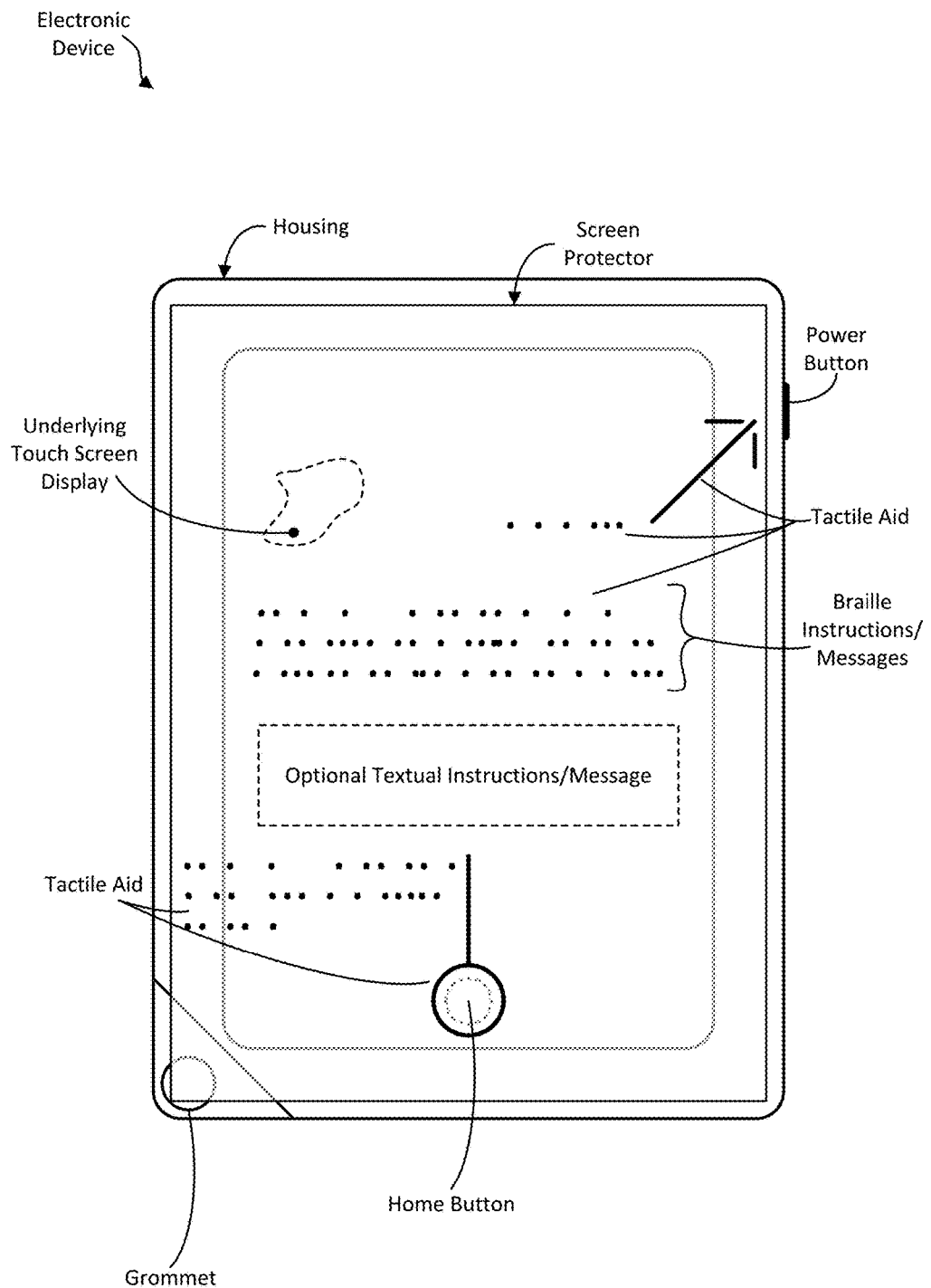
FIGS. 1a-b illustrate an example computing device including a screen protector configured in accordance with an embodiment of the present invention.

A simplified user interface (UI) mode of operation is provided, where complex user interface elements are replaced with simpler ones. For example, in one such embodiment, the simplified UI mode can be initiated, configured, or otherwise triggered when the device is placed into accessibility mode, for instance when setting up the device for the first time (out-of-box), or through the device's settings controls. Alternatively, the computing device may have a separate simplified UI mode, either as a sub-mode of accessibility or as a distinct feature on its own. The simplified UI mode places information in a format which can be readily navigated by means of gesture-invoked audible prompts. In one such embodiment, content, functions, and/or other selectable items on the home screen of the user's device (or from the main panels of the device) are assembled into a one-dimensional list. In some cases, the simplified UI mode can be configured to receive a parsing gesture that causes an item of the list to be aurally presented to the user, and a selection gesture to select the last aurally presented item. In one specific such example case, the location of the parsing/select gestures can be anywhere on the touch sensitive surface and need not necessarily be on or otherwise near the presented list. The simplified UI mode may be used in conjunction with a screen protector configured with tactile aids for users with impaired vision. The screen protector can be placed on the display screen of a computing device to further enhance the out-of-box experience for vision-impaired users and/or guide the user during subsequent use of the device.

General Overview

Presently, electronic computing devices support accessibility features for users with disabilities. For example, a computing device may feature a selectable mode where the text labels on screen controls can be spoken aloud to the user. However, there still remain various unresolved problems associated with such modes. For instance, currently available accessibility techniques do not address the initial process of powering up, configuring, and enabling the accessibility features. Some existing solutions offer printed initial configuration instructions on screen protectors, but such solutions are not workable for the vision-impaired. Other existing solutions implicate a degree of complexity effectively rendering them impractical for many users. Moreover, vision-impaired users may further struggle with finding touch screen controls in a rich user interface, which may feature controls placed on the screen in an irregular or otherwise inconsistent fashion, or placed on sliding panels (such as the home screen of devices using the Android platform). For instance, a vision-impaired user cannot visually locate or otherwise benefit from an icon or other such user-selectable items (e.g., shortcuts to books or music, and a clock) after those icons/items variously change position on a home screen of a given computing device. Adding to the complexity, the home screen itself may be scrollable or pannable.

Thus, and in accordance with an embodiment of the present invention, a simplified UI mode of operation is provided, where complex user interface elements are replaced with simpler ones. For example, in one such embodiment, the simplified UI mode can be initiated, configured, or otherwise triggered when the device is placed into accessibility mode, for instance when setting up the device for the first time (out-of-box), or through the device's settings controls. Alternatively, the computing device may have a separate simplified UI mode, either as a sub-mode of accessibility or as a distinct feature on its own. The simplified UI mode places information in a format which can be readily navigated by means of gesture-invoked audible prompts. In one such embodiment, content, functions, and/or other selectable items on the home screen of the user's device (or from the main panels of the device) are assembled into a one-dimensional list.

In some cases, the simplified UI mode may be further configured to receive a vertical drag gesture that causes each item of the list to be aurally presented to the user as the drag gesture progresses downward. In a more general sense, the simplified UI mode can be configured to receive a parsing gesture (e.g., downward swipe gesture) that causes an item of the list to be aurally presented to the user, and a selection gesture (e.g., release of the drag gesture or a two-finger tap gesture) to select the last aurally presented item. Numerous other such touch-based or other suitable parsing/selection gesture schemes will be apparent in light of this disclosure. In one specific example embodiment, the location of the parsing/select gestures can be anywhere on the touch sensitive surface and need not necessarily be on or otherwise near the presented list.

In some embodiments, the simplified UI mode is used in conjunction with a screen protector that is provided with tactile aids for users with impaired vision. The screen protector can be placed on the display screen of a computing device, such as a tablet or smartphone or other mobile computing device, to further enhance the out-of-box experience for vision-impaired users. For example, the screen protector can be placed on the device during the manufacturing and packaging process, and configured to be tactilely-informative about how to activate special accessibility features (such as the simplified UI mode) of the device and/or how to proceed with initial set-up and configuration of the device.

In one example embodiment, the screen protector includes braille instructions for activating a special accessibility mode that facilitates further use of the device by a person with vision impairment (e.g., blindness or diminished ability to see). In one such case, the screen protector further includes a raised or embossed arrow or other tactile aid that effectively points from the braille instruction to a location of a user interface (UI) control feature that can be tapped, pressed or otherwise engaged to initiate the special accessibility mode or other desired function. Thus, the user can read the braille message and thereby be instructed to follow the raised arrow (or other tactile locationing aid) to a location on the touch screen where the user can then initiate a specified function or mode.

For instance, the braille message may instruct the user to follow the tactile locationing aid from the braille message to a location on the device where the user can provide a press-and-hold touch or a swipe gesture at the target location designated by the tactile aid so as to engage a special accessibility mode that aurally presents subsequent instructions and guidance to the vision-impaired user. In some such cases, the braille message may further include instructions as to what type of touch or gesture must be provided to initiate the mode, such as a two-finger press-and-hold of 10 seconds, or a V-shaped gesture (for voice). Numerous engagement mechanisms can be used.

In another embodiment, the braille message may instruct the user to follow the tactile locationing aid from the braille message to a location on the device where the user can engage a physical button or other UI control feature so as to initiate the special accessibility mode. Again, the braille message may include instructions as to how the user should engage that physical UI control feature to initiate the mode, such as a press-and-hold of 5 to 10 seconds on the home button or the volume-up button, for instance. As will be appreciated in light of this disclosure, the techniques provided herein can be used to initiate other functions as well. For example, the braille message may instruct the user to follow the tactile locationing aid from the braille message to a location on the device where the user can engage a virtual or physical button so as to increase the volume or some other desired function. Likewise, the braille or otherwise tactile instructions may include information that instructs the user on, for example, how to remove the screen protector, how to turn on the device, how to connect peripheral devices such as braille keyboards or displays, or otherwise provide instruction/information that will facilitate use of the device.

In some embodiments, the location of the UI control feature to be engaged by the user can be smooth to the touch, and the tactile aid of the screen protector effectively leads to and highlights that location for the user (e.g., with a raised arrow head pointing at the location, or a raised circle or square around the location). Note that sighted users may also see the target UI control feature in some cases, while in other embodiments there may be nothing actually displayed at that location for a sighted user to see (an active touch spot that is scanned for user input but that has no corresponding visual icon or control feature). Note that the screen protector can remain on the device after initial set-up and device configuration to continue to identity the touch location of various functions (e.g., launch browser, send message, etc). Further note that the screen protector may include textual instructions for sighted users. These textual instructions may be in the same position as the tactile instructions, since they may be readable through the tactile.

In other embodiments, the location of the UI control feature of the computing device may include a raised element (and/or a depressed element, as the case may be) that allows the user to further tactilely confirm that he/she has located the proper UI control feature. The device may have a combination of smooth and/or tactile UI control features having locations identified or otherwise accentuated by tactile aids of the screen protector, in accordance with some embodiments.

In some embodiments, the UI control feature identified with tactile aid(s) may be, for example, an icon or a virtual button, a physical home or power button, a volume button, or any other virtual or physical UI control feature that can be engaged to facilitate a vision-impaired user's out-of-box experience and/or continued use of the computing device. As previously explained, no visible UI control feature is necessary, so long as the touch sensitive surface can detect the touch in the target location. Depending on the touch sensitive surface technology, the touch may be directly on the surface or hovering a short distance (e.g., a few centimeters) over the surface. In any such cases, once the vision-impaired user has engaged a special accessibility mode with the aid of the tactilely informative screen protector, the user may receive verbal instructions going forward so as to allow the user to successfully use the device.

Computing Device Architecture

Figure 1B:
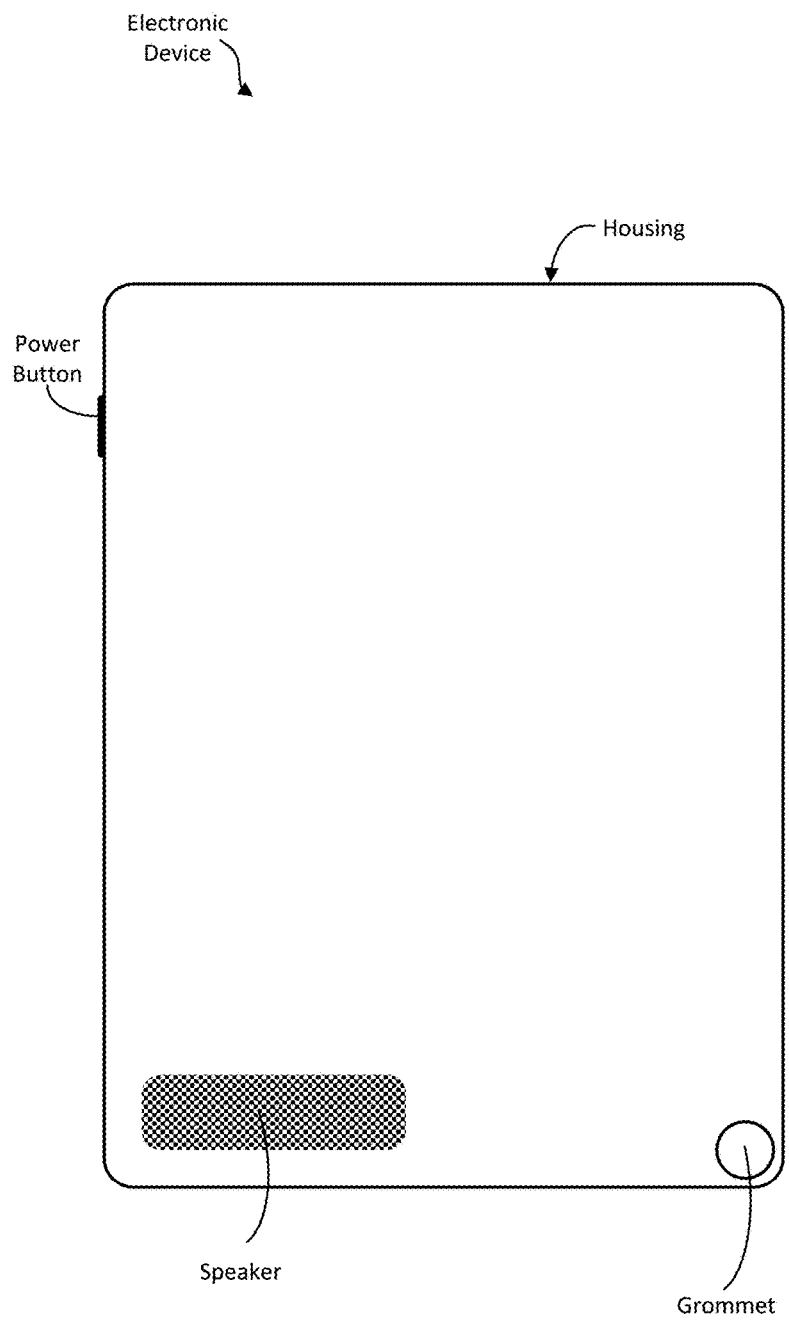

FIGS. 1a-b illustrate an example computing device including a screen protector configured in accordance with an embodiment of the present invention. The device could be, for example, a tablet such as the NOOK® Tablet or NOOK® eReader by Barnes & Noble. In a more general sense, the device may be any electronic device having capability for displaying content to a user, such as a mobile phone or mobile computing device such as a tablet or laptop, a desktop computing system, a television, a smart display screen, or any other device having a touch screen display. As will be appreciated, the claimed invention is not intended to be limited to any particular kind or type of electronic device.

As can be seen with this example configuration, the device comprises a housing, a touch screen display, and a screen protector provided over that touch screen display. The housing includes a number of hardware features such as a grommet, a speaker, a power button, and a home button. The grommet can be used, for example, to stow or otherwise secure the device in a notebook, bag or case. The speaker can be used to aurally present content and/or instructive information (such as aurally presented prompts provided during an accessibility mode) to the user. The touch screen display can be used in conjunction with a touch-based user interface (UI). One example touch-based UI includes a quick navigation menu or tool bar having a number of user-selectable categories (e.g., Home, Library, Shop, Search, and Settings) so as to provide quick access to various features of the device. The touch-based UI may further include other features such as a status bar that includes one or more icons (e.g., a wireless network icon), a battery indicator, and a clock, to name a few examples. Other embodiments may have fewer or additional UI touch screen controls and features, or different UI touch screen controls and features altogether, depending on the target application of the device. Any such general UI controls and features can be implemented using any suitable conventional or custom technology, as will be appreciated.

The power button can be used to turn the device on and off, and may be used in conjunction with a touch-based UI control feature that allows the user to confirm a given power transition action request (e.g., such as a slide bar or tap point graphic to turn power off). The home button can be a virtual or physical press-button, and may be used in various ways. In one example embodiment, when the device is awake and in use, tapping the home button may display or otherwise present a quick navigation menu that provides quick access to various features of the device. The home button may further control other functionality, for example, if the user presses and holds the home button. For instance, an example such push-and-hold function could engage a special accessibility mode (if held for 5 to 10 seconds) or a power conservation mode (if held for greater than 10 seconds). The special accessibility mode can be invoked, for example, by a vision-impaired user to provide access to a user interface that is more user friendly, and the power conservation mode can be invoked to put the device to sleep or into an otherwise lower power consumption mode for an anticipated period of non-use. The home button may also be configured to cease an active function that is currently executing on the device, such as an accessibility mode or sub-mode thereof as variously described herein. Thus, in such an example embodiment, the home button may be associated with and control different and unrelated actions: 1) show or otherwise present the quick navigation menu; 2) exit a given mode of operation; and 3) put the device to sleep. Numerous other configurations and variations will be apparent in light of this disclosure, and the claimed invention is not intended to be limited to any particular set of virtual buttons, hardware buttons or other UI control features, or device form factor.

As can be seen, the screen protector is provided over the touch screen display and includes a number of tactile aids to assist vision-impaired users, and optionally includes textual instructions that may be useful for sighted users. As can be seen in this example embodiment, the tactile aids include three braille instructions/messages and two tactile locationing aids. One of the locationing aids tactilely identifies the location of the power button and the other locationing aid tactilely identifies the location of the home button. Note that such tactile locationing aids are particularly helpful in locating virtual UI control features that otherwise have no texture that might be detectable by touch, but can also be helpful in distinguishing between multiple physical UI control features. The screen protector will be discussed in further detail with reference to FIG. 2.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). Additional example details of the underlying OS and circuitry in accordance with some embodiments will be discussed in turn with reference to FIG. 1c.

Figure 1C:
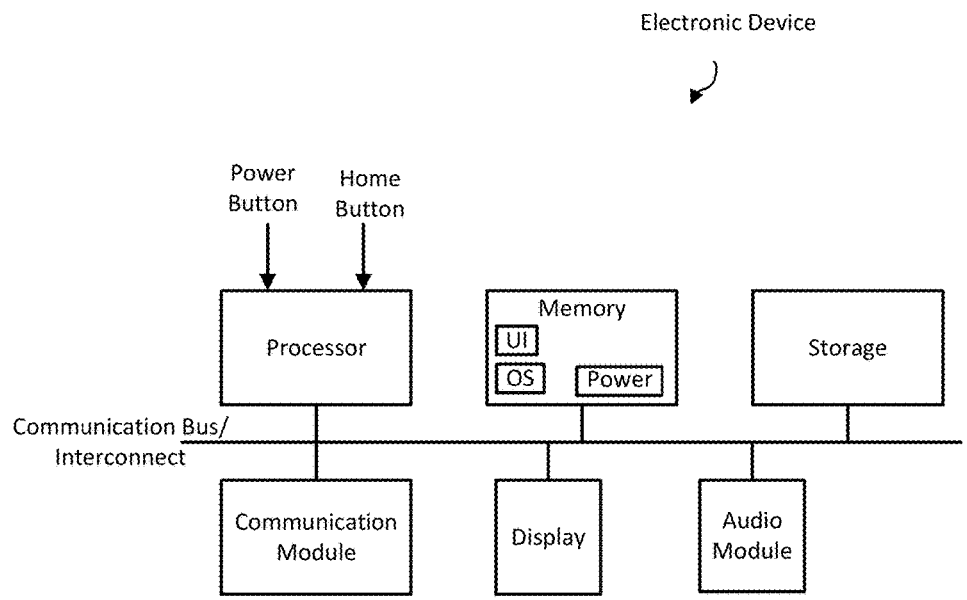
FIG. 1c illustrates a block diagram of the computing device of FIGS. 1a-b, configured in accordance with an embodiment of the present invention.

FIG. 1c illustrates a block diagram of an electronic device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). Further note that although a touch screen display is provided, other embodiments may include a non-touch screen and a touch sensitive surface such as a track pad, or a touch sensitive housing configured with one or more acoustic sensors, etc. In any such cases, the touch sensitive surface is generally capable of translating a user's physical contact with the surface into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on the memory (any suitable non-transient machine readable medium), that when executed by the processor (and/or co-processors), carries out the functionality of the device including a UI having an accessibility mode as described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The display can be implemented, for example, with a 7 to 9 inch 1920×1280 IPS LCD touchscreen touch screen, or any other suitable display and touch screen interface technology. As will be appreciated in light of this disclosure, the display may further include touch detection technology and can be any display that is configured with touch detecting technologies, whether capacitive, resistive, acoustic, active-stylus, and/or other input detecting technology. For example, in some embodiments, the screen display can be layered above input sensors, such as a capacitive sensor grid for passive touch-based input via a finger or stylus in the case of a so-called in-plane switching (IPS) panel, or an electro-magnetic resonance (EMR) sensor grid. In some embodiments, the touch sensitive display can be configured with a purely capacitive sensor, while in other embodiments the display may be configured to provide a hybrid mode that allows for both capacitive input and EMR input, for example. In still other embodiments, the touch sensitive display is configured with only an active stylus sensor. Numerous touch screen display configurations can be implemented using any number of known or proprietary screen based input detecting technologies. In any such embodiments, the display may further include a controller configured to selectively scan the touch sensitive display and/or selectively report touch inputs detected directly on or otherwise sufficiently proximate to (e.g., within a few centimeters, or otherwise sufficiently close so as to allow detection) the touch sensitive display. In one example embodiment, a touch input can be provided by a stylus or finger(s) hovering some distance above the touch sensitive surface (e.g., one to a few centimeters above the surface, or even farther, depending on the sensing technology deployed in the touch sensitive display surface), but nonetheless triggering a response at the device just as if direct contact were provided directly on the display.

The communications module can be, for instance, any suitable 802.11b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc). The device may be smaller, for example, for smartphone and tablet applications and larger for smart computer monitor applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured, for example, to automatically transition the device to a low power consumption or sleep mode after a period of non-use. A wake-up from that sleep mode can be achieved, for example, by a physical button press and/or a touch screen swipe or other action. The user interface (UI) module can be, for example, based on touch screen technology and the various example screen shots and use case scenarios shown in FIGS. 1a, 2, 3, and 4a-c, in conjunction with the accessibility mode methodologies demonstrated in FIG. 5, which will be discussed in turn. The audio module can be used in conjunction with the speaker and configured, for example, to aurally present initial configuration or use instructions or selected content, if preferred by the user (e.g., as part of a special accessibility mode suitable for vision-impaired users). Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Figure 1D:
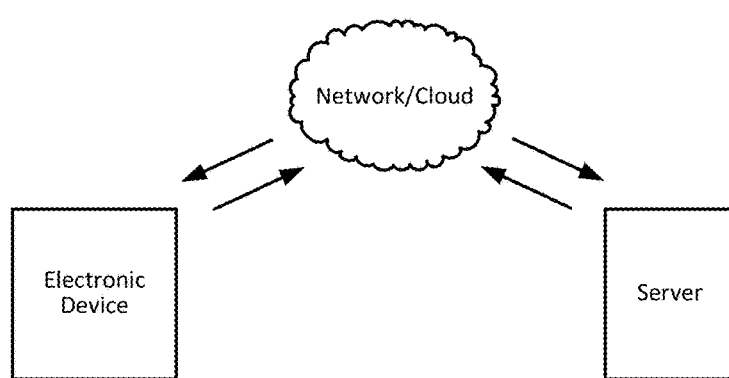
FIG. 1d illustrates a block diagram of a communication system including the computing device of FIGS. 1a-c, configured in accordance with an embodiment of the present invention.

FIG. 1d illustrates a block diagram of a communication system configured in accordance with an embodiment of the present invention. As can be seen, the system generally includes an electronic device (such as the one shown in FIGS. 1a-c) that is capable of communicating with an application server via a network/cloud. In this example embodiment, the electronic device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the device and to respond to those requests by providing the user with requested or otherwise recommended content. In some such embodiments, the server is configured to remotely provision an accessibility mode or sub-mode to the device (e.g., via JavaScript or other browser based technology configured to provision list-based content that can be aurally presented in response to a vertical drag gesture on the touch screen display). In one such case, the URL of the application server (or other location identifier associated with the server) can be brought to the user's attention via a tactile aid provided on the screen protector. Thus, when the user touches or otherwise selects the URL as directed and guided by the tactile aid, the device will issue a request to the server to issue content in a spoken or otherwise aurally presented format. In other embodiments, portions of the accessibility methodology are executed on the server and other portions of the methodology are executed on the device. Numerous server-side/client-side execution schemes can be implemented to facilitate a content selecting mode in accordance with an embodiment, as will be apparent in light of this disclosure.

Screen Protector

Figure 2:
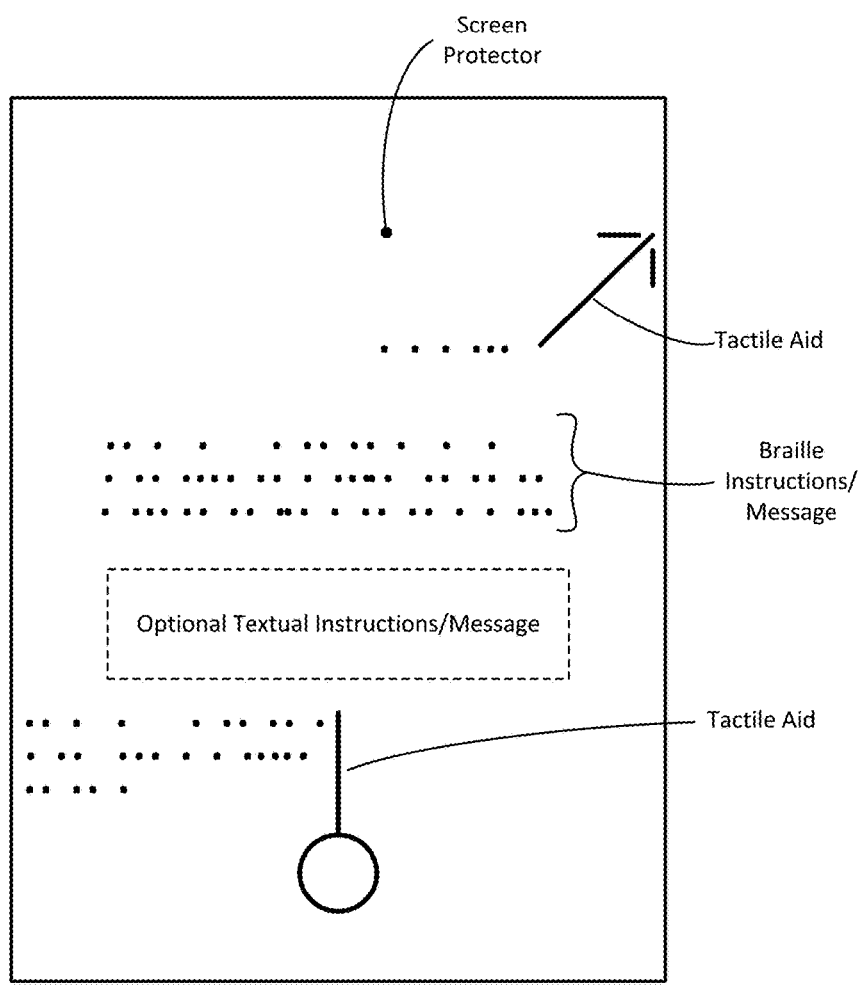
FIG. 2 illustrates a screen protector configured in accordance with an embodiment of the present invention.

FIG. 2 illustrates a screen protector configured in accordance with an embodiment of the present invention. As can be seen, the screen protector is configured with a number of tactile aids including instructions or messages in braille and embossed or raised graphics. As can be seen in this example case, the graphics include an arrow pointing from a given braille message to the power switch on the side of the device.

In one such example case, the braille message might be, for instance, "Power switch is located here—follow raised arrow." The graphics also include a raised line provided from another given braille message to a circle around the home button. In one such example case, the braille message might be, for instance, "press and hold for 10 seconds the home button within the raised circle at the end of this line to enter special accessibility mode." Numerous other tactile aids will be apparent in light of this disclosure (e.g., a single line or multiple lines and arrow-heads/circles/squares pointing to or otherwise identifying the location of device features, such as volume controls, headphone jacks, or other aids).

As will be further appreciated, the braille messages may include any type of helpful instructions or information that may improve the user experience of a vision-impaired user of the device. For instance, a given braille message may include instructions on how to remove the screen protector, how to turn on the device, how to activate special accessibility features of the device, how to connect peripheral devices such as braille keyboards or displays, how to initiate aural presentation of device configuration routine, how to access the quick launch menu of the device so as to access the control settings or other feature, how to access technical support, how to access forums suitable for similarly situated users (e.g., a blog or forum developed by and for vision-impaired users), etc. As can be further seen, such an enhanced screen protector may also include textual instructions for sighted users. In one such embodiment, these textual instructions may be in the same position as the tactile instructions, since they may be readable through the tactile aids.

The screen protector can be implemented with any number of suitable materials, such as clear plastic film or velum or any material upon which tactile aids can be embossed or otherwise provisioned (e.g., paper, cardboard, foil, rigid plastic, glass, metal, ceramic, etc). The screen protector may be left attached to the device, or may be removed/disposable once the user has used the protector to learn about the accessibility mode of the device. In the disposable case, the user can peel-off or otherwise remove and discard the screen protector, in accordance with some embodiments. The screen protector may be transparent, but need not be, depending on the type of users anticipated. In any such cases, conventional embossing and/or printing techniques can be used to impart the tactile aids to the screen protector (e.g., pressure-based imprinting, vacuum-based imprinting, lithography, injection molding, etching, laser printing for braille, etc). The screen protector can then be fixed to or otherwise secured on the display of the device. Note that, in some cases, the protector can be applied to the display screen early in the manufacturing process, so as to protect the display during subsequent manufacturing processes. Alternatively, the protector can be applied to the display screen at the end of manufacturing process prior to packaging. Alternatively, the protector can be purchased or otherwise acquired separately from the device and applied to the screen post-purchase of the device.

Figure 3:
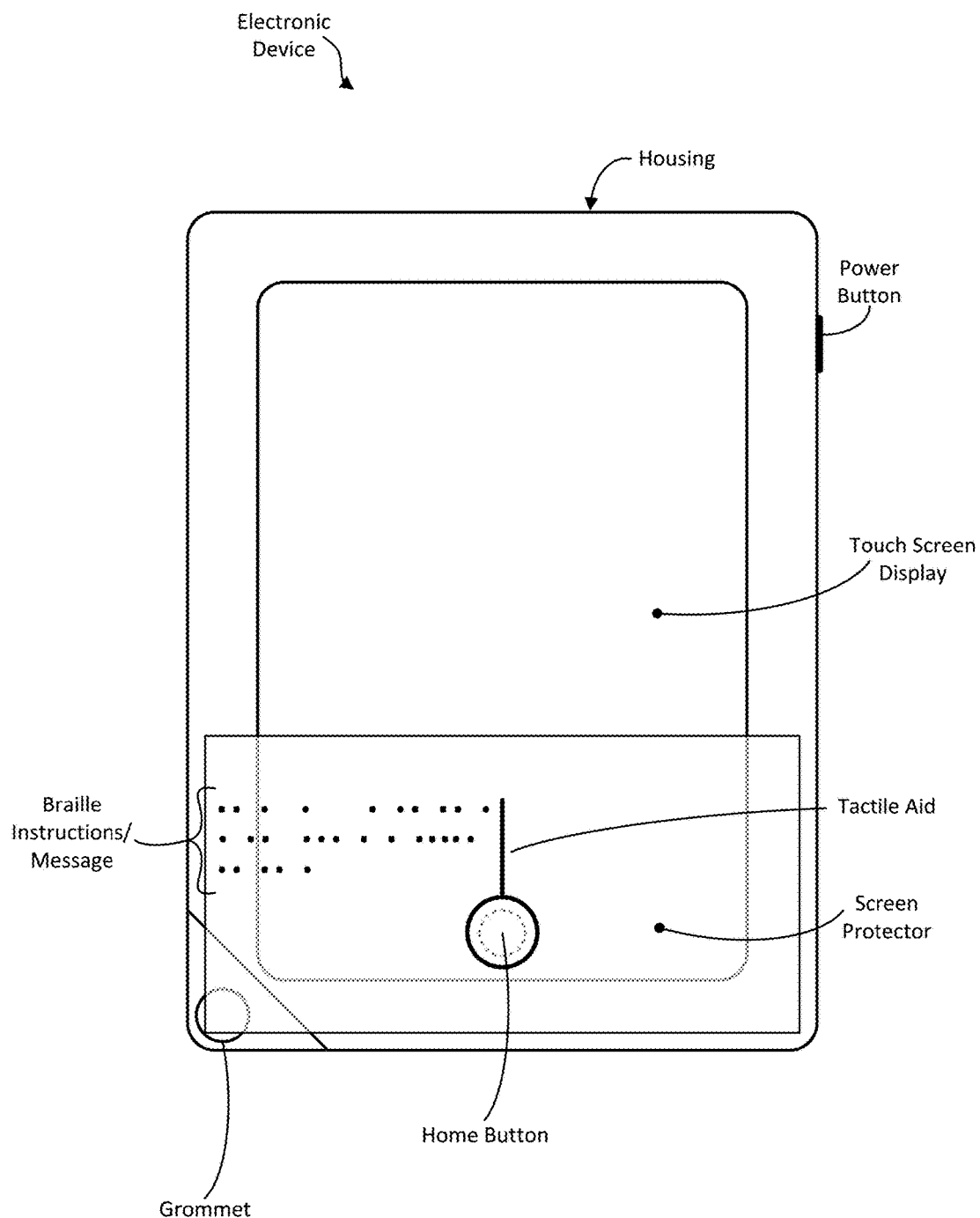
FIG. 3 illustrates an example computing device including a screen protector configured in accordance with another embodiment of the present invention.

FIG. 3 depicts an embodiment wherein the screen protector with tactile aids covers only a portion of the screen and allows the user to have access to the rest of the display. Such an embodiment may be useful, for example, for configurations where the user can enter the accessibility mode by pressing and holding a virtual home button or icon (e.g., as directed by the braille message and wherein the virtual home button or icon is within a raised circle or square at the end of a raised line from that runs from the braille message to the location of the virtual button/icon, such as shown in the example of FIG. 3), and still directly access the touch screen so as to provide touches and gestures to interact with the device. In one such case, once the accessibility mode is invoked, the location of the touches/gestures on the touch screen can be independent of the location of the content or other items being selected. In other words, the user need not have to see the selectable elements to make selections or otherwise interact with the device.

For instance, once invoked the accessibility mode of the device may be programmed or otherwise configured to provide all of the content and other user-selectable items on the home screen or panels, or some sub-set thereof based on for example user-selection or configuration, in a one-dimensional list. Subsequently, any drag gestures, taps, or other touches received anywhere on (or sufficiently proximate to) the touch screen can be used to cause the device to aurally present each item on the list in sequential order so that the presented item can be selected by the user. For example, the accessibility mode of the device may be configured to, in response to a vertical drag gesture (anywhere on touch screen), cause each item on the list to be aurally presented in sequence (e.g., from top to bottom), and in response to a subsequent screen tap (anywhere on touch screen) after a given aural presentation, cause selection of that aurally presented item. In this way, the user need not be able to see the content (or even the list) on the home screen or panels (or other user screens). Rather, once the accessibility mode is activated, the user can interact with the device via the simplified list-based UI and receive aural instructions and prompts to facilitate use of device and make content selections and otherwise direct the device by screen taps when appropriate, in accordance with an embodiment of the present invention. Additional details of a simplified UI will be provided with further reference to FIGS. 4a-c and 5.

Numerous other configurations of screen protectors that partially cover the underlying display screen will be apparent in light of this disclosure. For instance, in another embodiment, the screen protector may be configured with various tactile aids as variously discussed herein and also include an elongated cut-out or window where swipe and tap gestures can be provided. In one such example embodiment, once in the accessibility mode, the scan controller of the device can be configured to only scan and/or report touches that are provided in that window. Such selective scanning/reporting can be used to save on battery power, which is particularly helpful for mobile devices. Note that the gesture window may also be associated with a braille message that explains its purpose, and is effectively tactile in nature due to the detectable edge defining the perimeter of the window.

Simplified UI

Figure 4A:
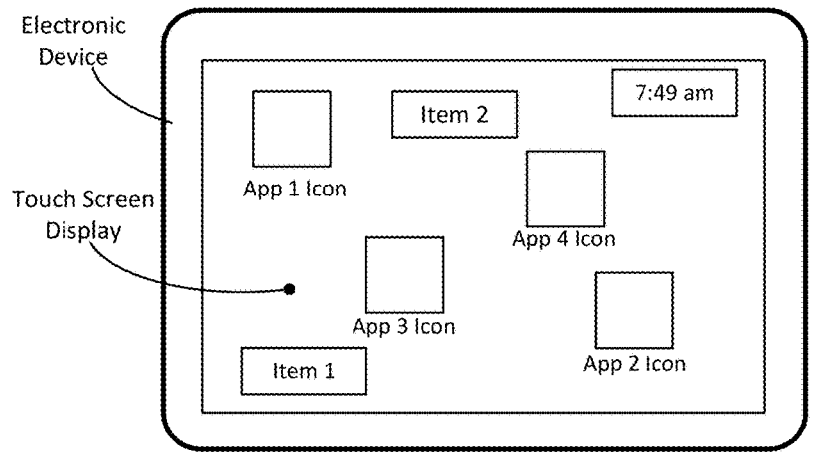
FIGS. 4a-c illustrate an example computing device configured with list-based user interface mode, in accordance with an embodiment of the present invention.
Figure 4B:
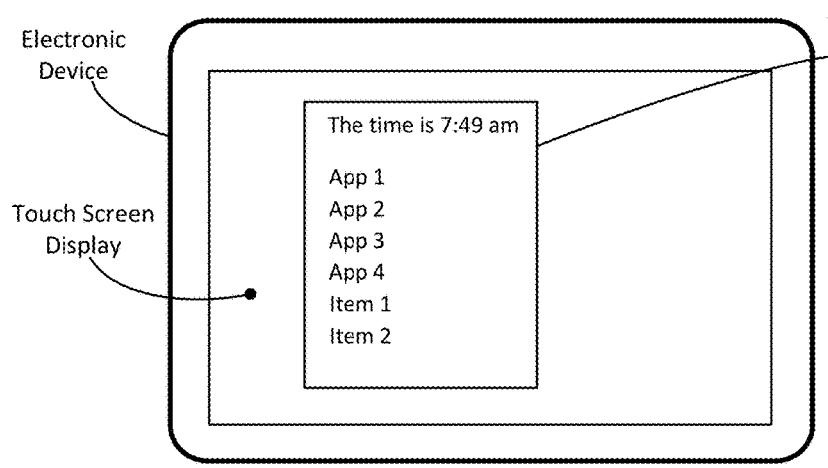
Figure 4C:
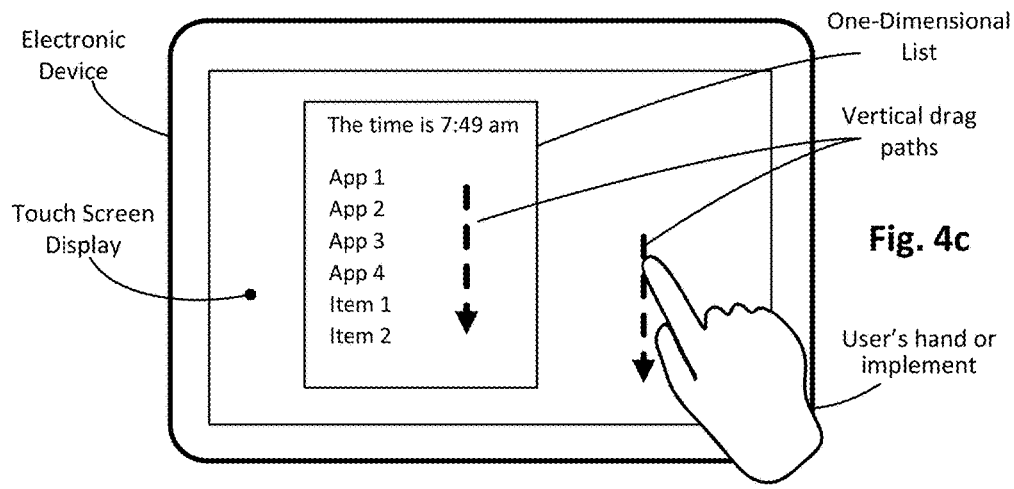

FIGS. 4a-c illustrate an example computing device configured with a simplified UI mode that includes a list-based selection mechanism, in accordance with an embodiment of the present invention. Note that the previous discussion with respect to FIGS. 1a-c is equally applicable here, although note that the simplified UI mode need not be used in conjunction with the screen protector. This simplified UI mode can be used to assist users with access and use of an electronic device, by effectively replacing complex user interface elements with simpler ones, and in one specific example case, by placing information in a list format which can be easily navigated by means of gesture-invoked audible prompts. In one embodiment, the simplified UI mode can be initiated, configured, or triggered, in response to the device being placed into the special accessibility mode as directed by the screen protector (e.g., "press and hold point at end of raised arrow to invoke accessibility mode"), for example, when setting up the device for the first time (out-of-box), or through the device's control settings. Alternatively, the simplified UI mode may be a sub-mode of the special accessibility mode, or a distinct feature that can be provided independently of any other modes or features of the device. To this end and as will be appreciated in light of this disclosure, the simplified UI has a usefulness that is independent of the screen protector.

As can be seen, FIG. 4a illustrates an example home screen of the device that includes multiple application icons and other items arranged in a random pattern on the screen. The application icons may include, for instance, an email application icon, a phone application icon, a settings icon, a game icon, and/or any other icons that can be tapped or otherwise selected to launch a corresponding application or function. Some examples of other items include, for instance, shortcuts to books or music or other consumable content, and a clock shown at the top right. Adding to the complexity of this UI arrangement is that the home screen may be scrollable or pannable, or include multiple panels that can be navigated with horizontal swiping or flicking gestures. For a vision-impaired user, such randomness and lack of consistent presentation can significantly impede or otherwise preclude use of the device. A user with cognitive disability may experience a similar disadvantage.

FIG. 4b illustrates an example simplified UI mode that includes a one-dimensional list that can be more easily navigated and interacted with, in accordance with an embodiment of the present invention. As can be seen, the one-dimensional list includes the various application icons and other items that were randomly positioned on the home screen shown in FIG. 4a. The simplified UI mode is programmed or otherwise configured to present these randomly positioned icons/items in list format. In one such embodiment, the simplified UI mode is further configured to, in response to a user's swipe or tap on the touch screen, aurally present each item on the list in a sequential fashion.

For example, in response to a first downward vertical swipe gesture the simplified UI mode can be configured to aurally present "Application 1", and in response to a second downward vertical swipe the simplified UI mode can be configured to aurally present "Application 2", and so on. Should the user wish to select the aurally presented item, the user can provide a screen tap. Thus, the user can use swipes to effectively navigate to the desired item on the list, and then select that item with a tap. The user can thus launch applications and access content as desired.

As previously explained, once the simplified UI mode is invoked, the location of the touches/gestures on the touch screen can be independent of the location of the content or other items being selected. In other words, the user need not have to see the selectable elements to make selections or otherwise interact with the presented list. For instance, and as shown in FIG. 4c, a downward swipe gesture can be provided directly on or close to the list, but can also be provided elsewhere on the screen (such as the lower right corner, as further shown in FIG. 4c). To this end, the simplified UI mode can be configured to, once invoked, direct the display controller to only report specific gestures that are used for navigating the list and making selections, or to exit the simplified UI mode, in accordance with an embodiment. Alternatively, the simplified UI mode can be configured to allow all contacts to be reported, but to respond to only the specific gestures allowed (e.g., downward two finger swipe to parse list via sequential aural presentation one item at a time, and two finger tap to select last aurally presented item of the list) and ignore all other touches. Such selective touch response may further enhance the user experience.

As will be appreciated in light of this disclosure, different gestures or touches by the user can be used to invoke different responses by the simplified UI mode. For example, note that the time is provided in a somewhat separate fashion from the rest of the listed items. In one such embodiment, in response to a two-finger downward vertical swipe gesture the simplified UI mode can be configured to aurally present the current time (e.g., "the time is 7:43 am"), and in response to a one-finger downward vertical swipe gesture the simplified UI mode can be configured to aurally present each item in the list in a sequential fashion as previously explained. Also, the selection of an aurally presented item can be made, for instance, with a two-finger tap, so as to distinguish a list-item selection gesture from some other command (such as a global "go-back" one-finger tap command). Numerous other such touch-based navigation schemes can be used.

In some embodiments, the simplified UI mode can be used in conjunction with a screen protector as previously described, wherein the list of selectable items can be presented within a cut-out or window of the screen protector. As previously explained, the scan controller of the device's display assembly can be configured to only scan and/or report touches that are provided within that window. Alternatively, or in addition, the screen protector may direct a vision-impaired user on how to invoke the simplified UI mode, so as to facilitate use of that device by the user.

In some embodiments, panning can be disabled in the simplified UI mode as can any panel-based navigation involving multiple screens, and all or a subset of items that would have been visually presented on those various screens are presented in list form as depicted in FIG. 4b (contrasted with FIG. 4a for a random home screen). In some cases, the user may select the items to be provided in the list and/or the list may include a number of default or otherwise hard-coded items that are automatically put in the list. For instance, during initial configuration, the simplified UI mode (or other accessibility mode) can be configured to aurally present a master list of available items to the user and the user can add any aurally presented item to the list by saying "yes" or "add to list" (or some other comparable voice command), or by tapping the touch screen twice or with a 2-finger tap. Conversely, excluding items from the list can be done, for instance, by saying, "no" or a 1-finger tap.

In some embodiments, the simplified UI mode is further configured to prioritize the list based on user-selection patterns and historical usage. Thus, items that are more frequently selected by the user can be moved toward the top of the list and items that are less frequently selected by the user can be moved toward the bottom of the list. Usage statistics can be maintained, for instance, in one or more variables/counters maintained by the simplified UI mode.

In some cases, audible navigation may be activated separately, and need not be configured in all embodiments. For instance, the simplified UI mode having a list-based interface with or without an audible navigation feature may be helpful to sighted users with cognitive impairments. If audio feedback is enabled, a user may one or more fingers down the list to hear each item aurally presented in turn. For example, in one embodiment, the name of a listed application can be aurally presented to the user, the title and/or description of listed consumable content can be aurally presented to the user, or in the case of a listed informational function such as a time function or a temperature function, the current time of day or the temperature can be aurally presented to the user. For content items, a snippet may be provided to the user, such as 10 seconds of a listed music file or playlist or the first few sentences of an eBook. Alternatively, or in addition, non-verbal sounds can be used, for example, so long as the user can associate those sounds with a listed piece of content or application or other selectable item of the list.

As will be appreciated, the simplified UI mode can be applied across a wide range of applications in a similar fashion, thus enhancing accessibility across the device experience. Note that the device may or may not include a screen protector, such as the one shown in FIG. 1*a*, 2 or 3, although any suitable screen protector configuration having tactile aids embossed thereon can be used. If the screen protector is included, it may be fixed to the device or removable, as previously explained.

Methodology

Figure 5:
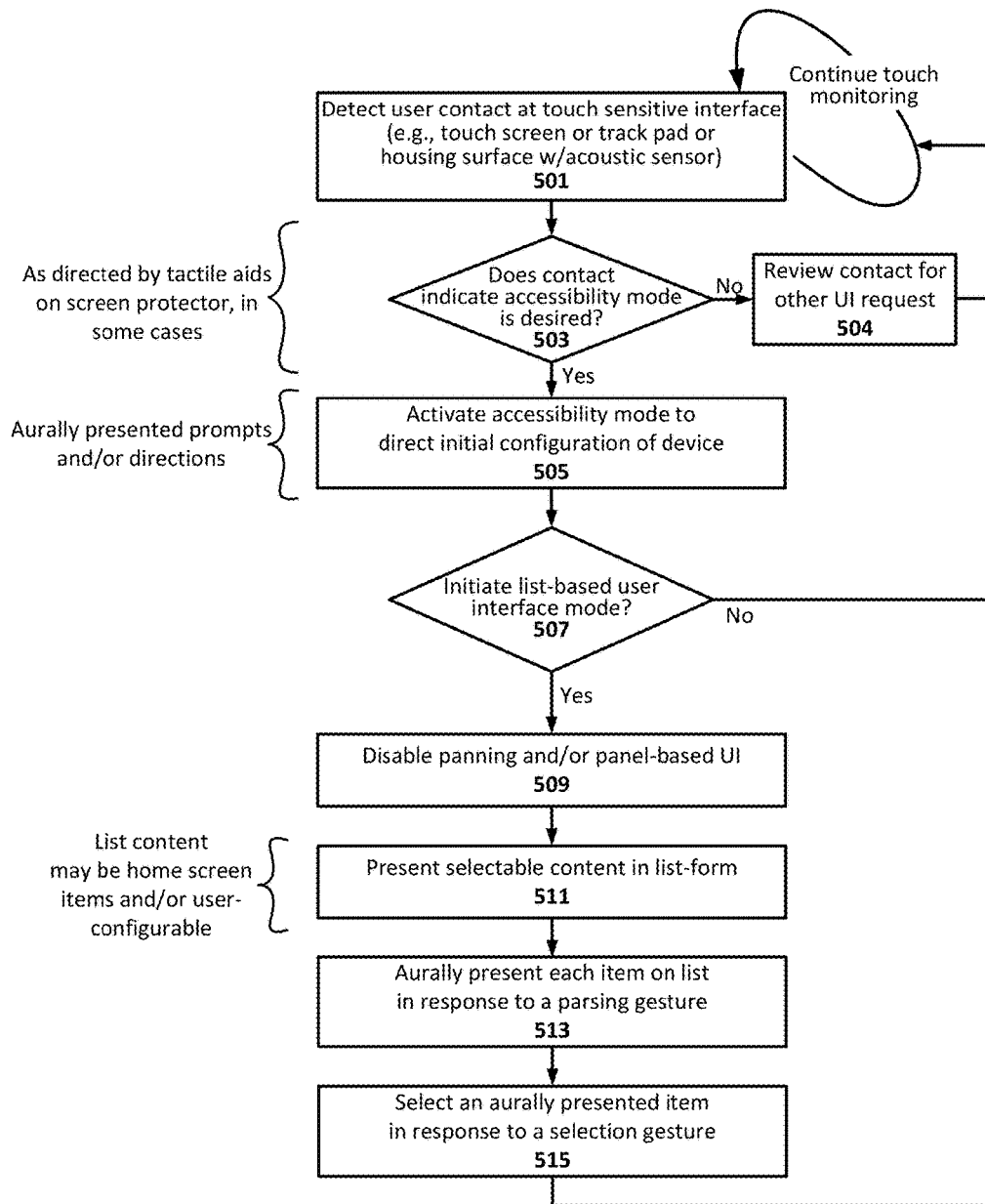
FIG. 5 illustrates a method of providing special accessibility to an impaired user of a computing device, in accordance with an embodiment of the present invention.

FIG. 5 illustrates a method of providing special accessibility to an impaired user of a computing device, in accordance with another embodiment of the present invention. This example methodology may be implemented, for instance, by the UI module of the touch sensitive device shown in FIG. 1*c*, or the touch sensitive device shown in FIG. 1*d* (e.g., with the UI provisioned to the client by the server). To this end, the UI can be implemented in software, hardware, firmware, or any combination thereof, as will be appreciated in light of this disclosure.

As can be seen, the method may be used in conjunction with a screen protector configured with tactile aids, but may also be used independently of (and without) such a screen protector. As can be further seen, this example embodiment includes sensing a user's input by a touch sensitive surface. In general, any touch sensitive device may be used to detect contact with it by one or more fingers and/or styluses. As soon as the user begins to drag or otherwise move the contact points, the UI code (and/or hardware) can assume a drag gesture has been engaged and track the path of each contact point with respect to any fixed point within the touch surface until the user stops engaging the touch sensitive surface. The release point can also be captured by the UI as it may be used to commit the action started when the user pressed on the touch sensitive surface. In a similar fashion, if the user releases hold without moving the contact point, a press or press-and-hold command may be assumed depending on the amount of time the user was continually pressing on the touch sensitive surface. These main detections can be used in various ways to implement UI functionality. In still other embodiments, an accessibility mode configured with a list-based presentation that can be aurally presented to the user as described herein can be used on a system that includes any type of user input mechanism, such as a mouse, joystick, or other suitable user input device, wherein input provided by the given input device causes a detectable and actionable signal that can be used to invoke and/or otherwise direct the methodology.

In this example case, the method includes detecting 501 user contact at the touch sensitive interface. In general, the touch monitoring is effectively continuous. The method continues with determining 503 if the contact indicates that the accessibility mode is desired. As previously explained, the touch that invokes the accessibility mode can be provided, for example at a specific location on the touch screen and/or on a specific UI control feature. In some such embodiments, that specific location may be highlighted by tactile aids of a screen protector that further includes a braille message to the user explaining how to invoke the accessibility mode. In any case, the determining 503 may include selectively scanning and reporting touches (direct or otherwise sufficiently proximate) at that location. Further recall that the location may be visually identified with a marker (e.g., icon or switch) or not.

If it is determined that the accessibility mode is not desired, the method continues with reviewing 504 the contact for some other UI request. However, if it is determined that the accessibility mode is desired, the method continues with activating 505 the accessibility mode to direct initial configuration of device. Thus, a special mode of operation is invoked to allow an impaired user to continue use of the device. The user may be, for instance, vision-impaired and/or cognitive-impaired. In some example embodiments, this accessibility mode of operation is configured to aurally present information and choices to the user during initial configuration of the device, thereby providing an enhanced out-of-box experience for the impaired user. As will be appreciated in light of this disclosure, the accessibility mode may further include (or alternatively include) a simplified user interface that is more accommodating of the user's impairment.

The method of this example embodiment continues with determining 507 if a list-based user interface mode should be initiated. In some example cases, if the user has provided the initial touch (or other user input) at 503, then this list-based UI mode can be automatically invoked as part of the overall accessibility mode. In other embodiments, the list-based UI mode is invoked separately or not at all, if so desired. For instance, in some example embodiments, the methodology comprises invoking an accessibility mode in response to receiving user input as directed via a tactically-enhanced screen protector, without providing any list-based UI mode of operation.

If it is determined at 507 that a list-based user interface mode should not be initiated, then the methodology concludes and continues to monitor for other touches (or other user input). On the other hand, if it is determined at 507 that a list-based user interface mode should be initiated, then the methodology continues with disabling 509 panning and/or panel-based UI functionality. As previously explained, navigating a pannable or multi-screen UI presents a particular challenge to some users, so disabling or otherwise removing such functionality from consideration allows for that user to continue using the device in the context of a positive user experience.

The method continues with presenting 511 selectable content in list-form. As previously explained, the content included in the list may be user-configurable and/or hard-coded, and may further be prioritized based on usage history associated with a given user. Note that different users of the same device may have different usage statistics, so in some such embodiments, a user account can be established so as to allow the accessibility mode to distinguish between users.

The method continues with aurally presenting 513 each item on the list in a sequential fashion and in response to a parsing gesture (e.g., vertical drag gesture or three finger tap), and selecting 515 an aurally presented item in response to a selection gesture (e.g., upon release of vertical drag gesture or two finger tap). Numerous parsing and selection gesture schemes can be used as will be appreciated in light of this disclosure. As previously explained, the aural presentation may include, for instance, the name of a listed application (e.g., "word processor" or "email"), or the title and author and/or a snippet of listed consumable content (e.g., "The Catcher in the Rye, J.D. Salinger: 'If you really want to hear about it, the first thing you'll probably want to know is where I was born, and what my lousy childhood was like, and how my parents were occupied and all before they had me, and all that David Copperfield kind of crap, but I don't feel like going into it, if you want to know the truth'"), or the result/output of a listed function (e.g., enunciation of current time or temperature). After a selection is made, the methodology may repeat as desired.

Numerous variations will be apparent in light of this disclosure. For instance, one example embodiment of the present invention provides a computing system. The computing system includes a display for presenting content to a user, a processor, and a simplified user interface mode executable on the processor and configured to present selectable content for display in a list format, wherein that selectable content is presented for display in a non-list format when the system is not in the simplified user interface mode. In some cases, the simplified user interface mode is further configured to aurally present items in the list in response to a user swipe gesture. In some cases, the simplified user interface mode is further configured to disable panning. In some cases, the selectable content in list format comprises user-defined items. In some cases, the display is a touch screen display. In some cases, the system further includes a screen protector for protecting the display and having one or more tactile aids configured to facilitate use of the system by a vision-impaired user. In some such cases, the one or more tactile aids include a braille message. In some cases, the braille message includes information on how to remove the screen protector from the display. In some cases, the braille message includes information on how to turn on the system. In some cases, the braille message includes information on how to activate the simplified user interface mode. In some cases, the braille message includes information on how to connect peripheral devices that will assist the vision-impaired user in use of the system. In some cases, the one or more tactile aids include a raised directional element that identifies a location of a user interface control feature of the system. In some such cases, the raised directional element includes a raised line that runs from proximate to a braille message to a location of a user interface control feature of the system. In some cases, the screen protector is configured to only cover a portion of the display. In some cases, the one or more tactile aids of the screen protector tactilely indicate how to activate the simplified user interface mode.

Another embodiment provides a computing system. In this example case, the system includes a touch screen display for receiving input from a user, a processor, and a simplified user interface mode executable on the processor and configured to disable panning and present selectable content for display in a list format, wherein that selectable content is presented for display in a non-list format when the system is not in the simplified user interface mode, and wherein the simplified user interface mode is further configured to aurally present items in the list in response to a user parsing gesture. In some such cases, the selectable content in list format comprises user-defined items. In some embodiment, the system further includes a screen protector for protecting the display and having one or more tactile aids configured to facilitate use of the system by a vision-impaired user, wherein the one or more tactile aids tactilely indicate how to activate the simplified user interface mode.

Another embodiment provides a computer program product comprising a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to, in a simplified user interface mode of the device, present user-selectable content for display in a list format, wherein that selectable content is presented for display in a non-list format when the device is not in the simplified user interface mode. The process is further configured to aurally present items in the list in response to a user parsing gesture. In some cases, in the simplified user interface mode, the process may be further configured to disable panning.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computing system comprising:
   a display for presenting content to a user;
   a processor;
   a simplified user interface mode executable on the processor and configured to present selectable content for display in a list format; and
   a screen protector for protecting the display and having one or more tactile aids configured to facilitate use of the computing system by a vision-impaired user;
   wherein the selectable content is presented for display in a non-list format when the computing system is not in the simplified user interface mode; and
   wherein the one or more tactile aids include at least one braille message including (a) a braille message that provides information on how to remove the screen protector from the display, (b) a braille message that provides information on how to turn on the computing system, (c) a braille message that provides information on how to activate the simplified user interface mode, and/or (d) a braille message that provides information on how to connect peripheral devices that will assist the vision-impaired user in using the computing system.

2. The computing system of claim 1, wherein the simplified user interface mode is further configured to aurally present portions of the selectable content in response to a user swipe gesture.

3. The computing system of claim 1, further comprising a default user interface mode executable on the processor and configured to present the selectable content in a plurality of panes which are accessed using a panning gesture.

4. The computing system of claim 1, further comprising a default user interface mode executable on the processor and configured to present the selectable content in a plurality of panes which are accessed using a panning gesture, wherein the simplified user interface mode is not responsive to the panning gesture.

5. The computing system of claim 1, wherein the one or more tactile aids include a braille message that provides information on how to activate the simplified user interface mode.

6. The computing system of claim 1, wherein the display is a touch screen display.

7. The computing system of claim 1, wherein the one or more tactile aids includes a raised directional element that identifies a location of a user interface control feature of the computing system.

8. The computing system of claim 1, wherein:
the one or more tactile aids includes a raised directional element that identifies a location of a user interface control feature of the computing system; and
the raised directional element includes a raised line that runs from (a) proximate to one of the braille messages to (b) the location of the user interface control feature.

9. The computing system of claim 1, wherein the screen protector is configured to only cover a portion of the display.

10. The computing system of claim 1, wherein the one or more tactile aids indicates how to activate the simplified user interface mode.

11. A computing system, comprising:
a display for presenting content to a user;
a processor;
a default user interface mode executable on the processor and configured to present content for display in a plurality of panes which are accessed using a panning gesture; and
a simplified user interface mode executable on the processor and configured to present at least a portion of the content for display in a list format;
wherein one or more tactile aids indicates how to activate the simplified user interface mode;
wherein the content is presented for display in a non-list format when the computing system is in the default user interface mode; and
wherein the simplified user interface mode is not responsive to the panning gesture.

12. The computing system of claim 11, wherein the content comprises one or more user-defined items.

13. The computing system of claim 11, further comprising a screen protector for protecting the display and having one or more tactile aids configured to facilitate use of the computing system by the user.

14. The computing system of claim 11, further comprising a screen protector for protecting the display and having one or more tactile aids configured to facilitate use of the computing system by the user, wherein the one or more tactile aids configured to facilitate use of the computing system include the one or more tactile aids that indicate how to activate the simplified user interface mode.

15. The computing system of claim 11, further comprising a screen protector for protecting the display and having one or more tactile aids configured to facilitate use of the computing system by the user, wherein the one or more tactile aids include a braille message that includes information that includes (a) information on how to remove the screen protector from the display, (b) information on how to turn on the computing system, (c) information on how to activate the simplified user interface mode, and/or (d) information on how to connect peripheral devices that will assist the user in using the computing system.

16. A non-transitory computer readable medium encoded with instructions that, when executed by at least one processor, cause a control process to be carried out, the control process comprising providing a touch sensitive display that includes a user interface having a simplified user interface mode in which a plurality of items are arranged in a list displayed on the touch sensitive display,
wherein the simplified user interface mode responds to a swipe menu navigation gesture that does not touch the list and that identifies one of the items by generating a first audible announcement of the identified item,
wherein the swipe menu navigation gesture must be performed multiple times to scroll through multiple items listed in the list,
wherein the simplified user interface mode responds to an item selection gesture by selecting the item that was identified by the swipe menu navigation gesture, and
wherein detection, at a location that is anywhere on the touch sensitive display, of the item selection gesture results in a response that is independent of the location on the touch sensitive display where the item selection gesture is detected, the location encompassing all portions of the touch sensitive display that are contacted by the item selection gesture.

17. The non-transitory computer readable medium of claim 16, wherein the touch sensitive display further includes a default user interface mode configured to present the items in a plurality of panes which are accessed using a panning gesture.

18. The non-transitory computer readable medium of claim 16, wherein:
the touch sensitive display further includes a default user interface mode configured to present the items in a plurality of panes which are accessed using a panning gesture, and
the simplified user interface mode is unresponsive to the panning gesture.

19. The non-transitory computer readable medium of claim 16, wherein the simplified user interface mode is further configured to aurally present the items in response to the swipe menu navigation gesture.

20. The non-transitory computer readable medium of claim 16, wherein:
the swipe menu navigation gesture is a swiping gesture, and
the item selection gesture is selected from a group consisting of a release of the swiping gesture and a tap gesture.

* * * * *